United States Patent
Mandal et al.

(10) Patent No.: US 10,884,912 B2
(45) Date of Patent: Jan. 5, 2021

(54) METHOD, SYSTEM, AND FRAMEWORK FOR TESTING A HUMAN MACHINE INTERFACE (HMI) APPLICATION ON A TARGET DEVICE

(71) Applicant: Wipro Limited, Bangalore (IN)

(72) Inventors: Swarup Mandal, Kolkata (IN); Souvik Dutta, Kolkata (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 187 days.

(21) Appl. No.: 16/041,180

(22) Filed: Jul. 20, 2018

(65) Prior Publication Data

US 2019/0370162 A1 Dec. 5, 2019

(30) Foreign Application Priority Data

Jun. 5, 2018 (IN) .............................. 201841021057

(51) Int. Cl.
*G06F 11/00* (2006.01)
*G06F 11/36* (2006.01)

(52) U.S. Cl.
CPC ...... *G06F 11/3692* (2013.01); *G06F 11/3664* (2013.01); *G06F 11/3684* (2013.01); *G06F 11/3688* (2013.01)

(58) Field of Classification Search
CPC ............. G06F 11/3692; G06F 11/3664; G06F 11/3684; G06F 11/3688
See application file for complete search history.

(56) References Cited

U.S. PATENT DOCUMENTS

| | | | |
|---|---|---|---|
| 9,940,223 B2* | 4/2018 | Tarnutzer | G06F 11/3688 |
| 2014/0303756 A1* | 10/2014 | Tarnutzer | G06F 11/3688 |
| | | | 700/83 |

(Continued)

FOREIGN PATENT DOCUMENTS

CN 206540976 U 10/2017

OTHER PUBLICATIONS

Stolle et al., "Challenges in Automated Model-Based HMI Testing," Conference: Informatik 2005, pp. 186-190 (2005).

(Continued)

*Primary Examiner* — Jonathan D Gibson
(74) *Attorney, Agent, or Firm* — Finnegan, Henderson, Farabow, Garrett & Dunner LLP

(57) ABSTRACT

This disclosure relates generally to a human machine interface (HMI) application, and more particularly to method, system, and framework for testing the HMI application on a target device. In one embodiment, the method may include accessing a test script corresponding to a test case for testing the HMI application on the target device. The test script may include a set of mutually independent primitive executables. Each primitive executable may be configured to simulate at least one of a trigger or a condition corresponding to a business logic (BL) component of the HMI application and to verify an output using at least one of a view component or a platform component of the HMI application. The method may further include transmitting each of the set of primitive executables to the target device for execution, and receiving a result corresponding to the execution of the each of the set of primitive executables.

15 Claims, 10 Drawing Sheets

(56) References Cited

U.S. PATENT DOCUMENTS

| | | | |
|---|---|---|---|
| 2017/0046247 A1* | 2/2017 | Nutter | G06Q 10/063 |
| 2018/0113802 A1* | 4/2018 | Yeddnapuddi | G06F 11/0751 |
| 2018/0329808 A1* | 11/2018 | Friedenberg | G06F 11/3608 |
| 2019/0050322 A1* | 2/2019 | Bhojan | G06F 11/3684 |
| 2019/0179739 A1* | 6/2019 | Smith | G06F 3/0418 |
| 2019/0294530 A1* | 9/2019 | Dutta | G06F 11/3684 |
| 2019/0370162 A1* | 12/2019 | Mandal | G06F 11/3692 |

OTHER PUBLICATIONS

"Discover Altran: World leader in engineering solutions and R&D", retrieved from internet https//www.altran.com/us/en (2018).

\* cited by examiner

| State Name | <State Name> | | |
|---|---|---|---|
| State Function ||||
| Type | Name | Parameter ||
| Entry | <Entry Func> | <Param1>:<Value1>;<br><Param2>:<Value2> ||
| Do | <Do Func> | <Param1>:<Value1>;<br><Param2>:<Value2> ||
| Exit | <Exit Func> | <Param1>:<Value1>;<br><Param2>:<Value2> ||
| Transition ||||
| Trigger1 | <Guard11> | <Action11> | <Next State> |
|  | <Guard12> | <Action12> | <Next State> |
|  | ? | ? | ? |
|  | <Guard1N> | <Action1N> | <Next State> |
| Trigger2 | <Guard21> | <Action21> | <Next State> |
|  | <Guard22> | <Action22> | <Next State> |
|  | ? | ? | ? |
|  | <Guard2N> | <Action2N> | <Next State> |
| ? | ? | ? | ? |
| TriggerM | <GuardM1> | <ActionM1> | <Next State> |
|  | <GuardM2> | <ActionM2> | <Next State> |
|  | ? | ? | ? |
|  | <GuardMN> | <ActionMN> | <Next State> |

FIG. 3

```
                                                          ┌─ 1100
                                                          ↙
┌─────────────────────────────────────────────────────────────────────┐
│  ACCESS A TEST SCRIPT CORRESPONDING TO A TEST CASE FOR TESTING A    │
│  HMI APPLICATION ON A TARGET DEVICE. THE TEST SCRIPT INCLUDES A SET │
│  OF MUTUALLY INDEPENDENT PRIMITIVE EXECUTABLES. EACH OF THE SET OF  │
│  PRIMITIVE EXECUTABLES IS CONFIGURED TO SIMULATE AT LEAST ONE OF A  │
│    TRIGGER OR A CONDITION CORRESPONDING TO A BUSINESS LOGIC (BL)    │
│  COMPONENT OF THE HMI APPLICATION AND TO VERIFY AN OUTPUT USING AT  │
│   LEAST ONE OF A VIEW COMPONENT OR A PLATFORM COMPONENT OF THE      │
│                        HMI APPLICATION 1101                         │
└─────────────────────────────────────────────────────────────────────┘
                                    ↓
┌─────────────────────────────────────────────────────────────────────┐
│    TRANSMIT EACH OF THE SET OF PRIMITIVE EXECUTABLES TO THE TARGET  │
│                     DEVICE FOR EXECUTION 1102                       │
└─────────────────────────────────────────────────────────────────────┘
                                    ↓
┌─────────────────────────────────────────────────────────────────────┐
│    RECEIVE A RESULT CORRESPONDING TO THE EXECUTION OF THE EACH OF   │
│              THE SET OF PRIMITIVE EXECUTABLES 1103                  │
└─────────────────────────────────────────────────────────────────────┘
```

FIG. 11

METHOD, SYSTEM, AND FRAMEWORK FOR TESTING A HUMAN MACHINE INTERFACE (HMI) APPLICATION ON A TARGET DEVICE

This application claims the benefit of Indian Patent Application Serial No. 201841021057 filed Jun. 5, 2018, which is hereby incorporated by reference in its entirety.

FIELD

This disclosure relates generally to a human machine interface (HMI) application, and more particularly to method, system, and framework for testing the HMI application on a target device.

BACKGROUND

HMI applications may allow a user to interact with a computing system for performing various tasks. Examples of the HMI application may include, but are not limited to, industrial machine controller, in-vehicle onboard device interface, web-based HMI server, marine control system, and large or small scale automation. As will be appreciated, with continuous evolvement of technologies, the HMI applications may require updates over time so as to implement the advancements and improvements. Further, product solutions are increasingly getting differentiated based on user experience they offer. The HMI applications have, therefore, become a key component of driving product differentiations. In order to maintain product differentiation and level of engagement of the user, the HMI applications may require periodic updates that provide new and improved Graphical User Interface (GUI) experience to the user. As a result, there may be a need for developing and validating the HMI applications and their updated versions in a cost effective, efficient, and scalable manner.

However, such development and validation may be challenging due to highly volatile nature of the HMI application and further due to increasing complexity of the HMI application. For example, the increasing complexity of the HMI application may put more demand on testing the HMI application so as to ensure the quality and robustness of the HMI application. Further, for example, frequent updates in the HMI application may adversely affect the testing of the HMI application (e.g., insufficient test coverage) or may adversely impact time to market. Further, existing test methodologies require significant computing resources (e.g., memory, processing capability, etc.) in a target device (i.e., device under test). As will be appreciated, the amount of computing resources available on most target devices may be very limited, and therefore testing of applications or components in such devices may be limited. For example, a target device may not even have enough memory to deploy a full fledge device agent (DA) as required by some of the existing testing methodologies. Moreover, resource availability may vary dynamically during the course of test execution, and may lead to termination of the testing session in such devices. In short, the limited and dynamic resource availability in the target device make the existing testing methodologies unfit and ineffective for testing the target device.

SUMMARY OF THE INVENTION

In one embodiment, a method for testing a human machine interface (HMI) application on a target device is disclosed. In one example, the method may include accessing a test script corresponding to a test case for testing the HMI application on the target device. The test script may include a set of mutually independent primitive executables. Each of the set of primitive executables may be configured to simulate at least one of a trigger or a condition corresponding to a business logic (BL) component of the HMI application and to verify an output using at least one of a view component or a platform component of the HMI application. The method may further include transmitting each of the set of primitive executables to the target device for execution. The method may further include receiving a result corresponding to the execution of the each of the set of primitive executables.

In one embodiment, a system for testing a HMI application on a target device is disclosed. In one example, the system may include a host service delivery platform (HSDP), which may further include at least one processor and a computer-readable medium storing instructions that, when executed by the at least one processor, may cause the at least one processor to access a test script corresponding to a test case for testing the HMI application on the target device. The test script may include a set of mutually independent primitive executables. Each of the set of primitive executables may be configured to simulate at least one of a trigger or a condition corresponding to a business logic (BL) component of the HMI application and to verify an output using at least one of a view component or a platform component of the HMI application. The processor-executable instructions, on execution, may further cause the processor to transmit each of the set of primitive executables to the target device for execution. The processor-executable instructions, on execution, may further cause the processor to receive a result corresponding to the execution of the each of the set of primitive executables.

In one embodiment, a non-transitory computer-readable medium storing computer-executable instructions for testing a HMI application on a target device is disclosed. In one example, the stored instructions, when executed by a processor, may cause the processor to access a test script corresponding to a test case for testing the HMI application on the target device. The test script may include a set of mutually independent primitive executables. Each of the set of primitive executables may be configured to simulate at least one of a trigger or a condition corresponding to a business logic (BL) component of the HMI application and to verify an output using at least one of a view component or a platform component of the HMI application. The stored instructions, when executed by the processor, may further cause the processor to transmit each of the set of primitive executables to the target device for execution. The stored instructions, when executed by the processor, may further cause the processor to receive a result corresponding to the execution of the each of the set of primitive executables.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

application on a target device, in accordance with some embodiments of the present disclosure.

Figure 2:
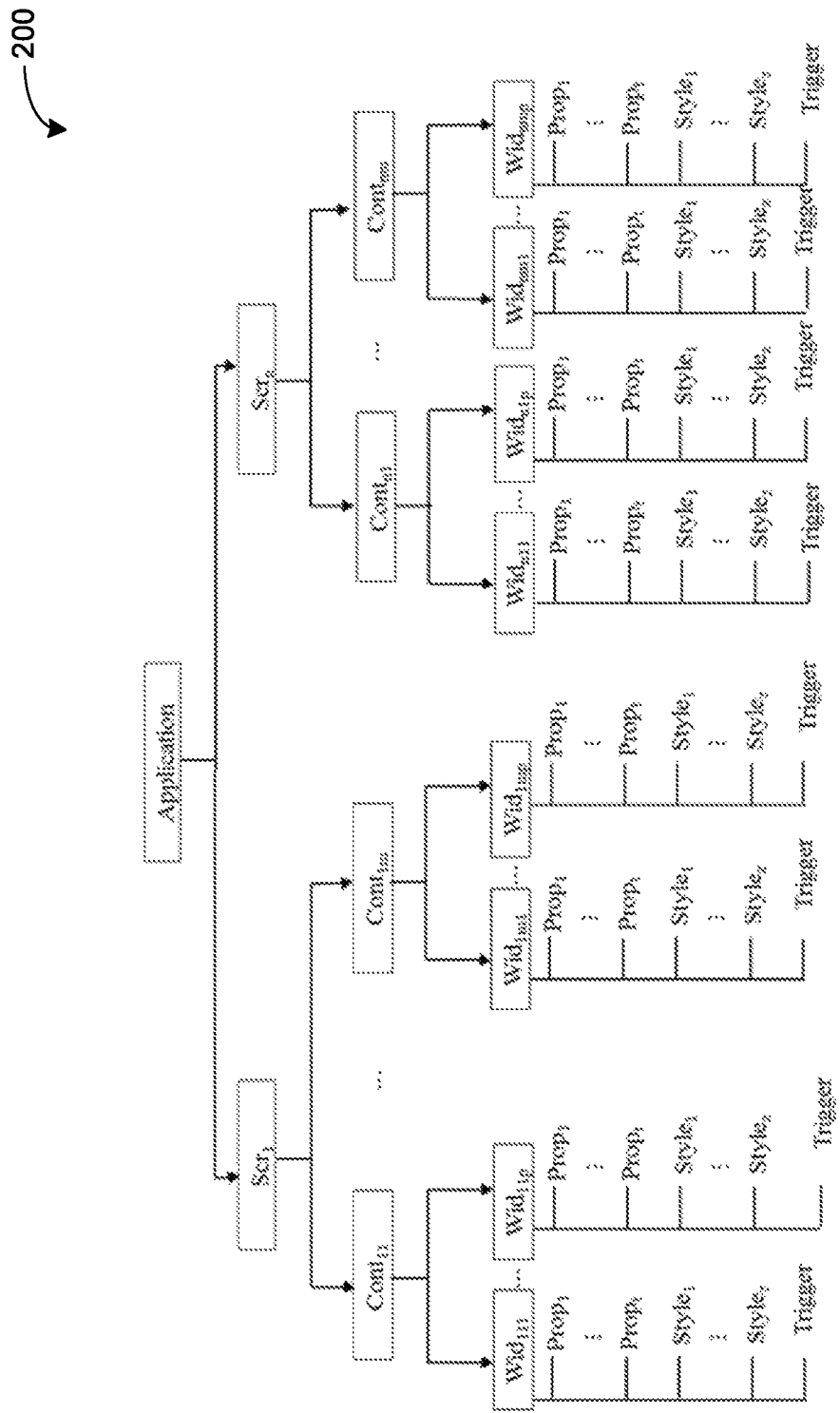

FIG. 2 is a schematic representation of an exemplary view information organization in an exemplary view component of the HMI application, in accordance with some embodiments of the present disclosure.

FIG. 3 is a tabular representation of an exemplary business logic (BL) information organization in an exemplary BL component of the HMI application, in accordance with some embodiments of the present disclosure.

Figure 4:
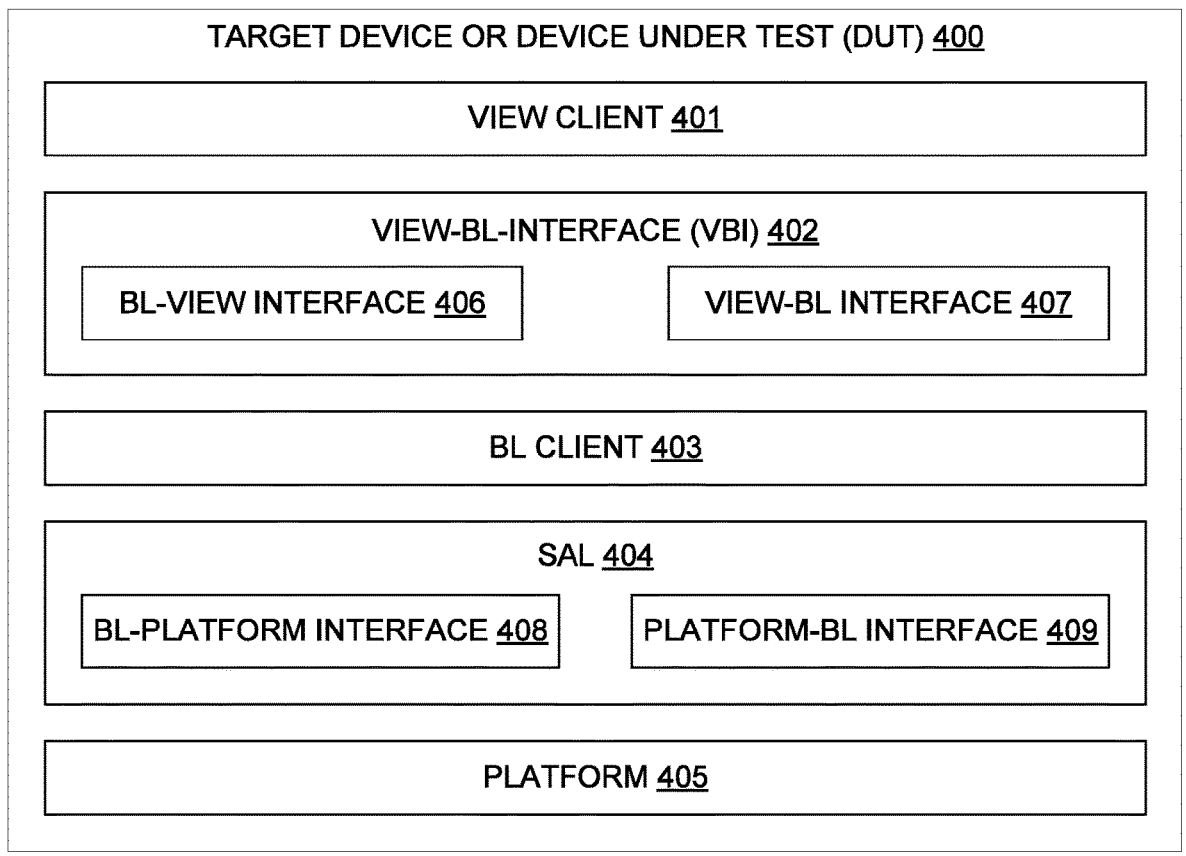

FIG. 4 is a functional block diagram of a target device, in accordance with some embodiments of the present disclosure.

Figure 5:
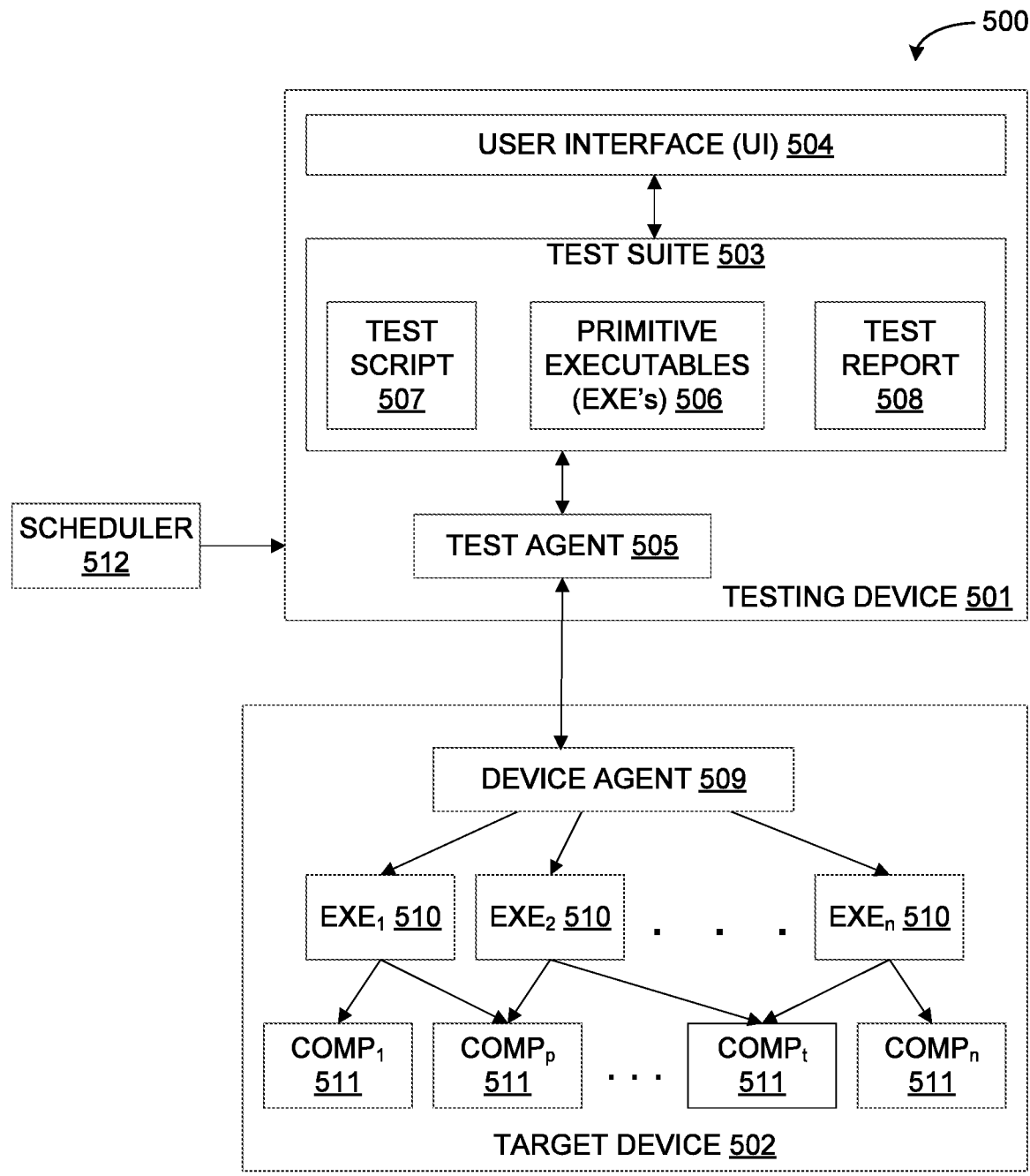

FIG. 5 is a block diagram of an exemplary HMI test automation framework (HTAF) for testing the HMI application on the target device, in accordance with some embodiments of the present disclosure.

Figure 6:
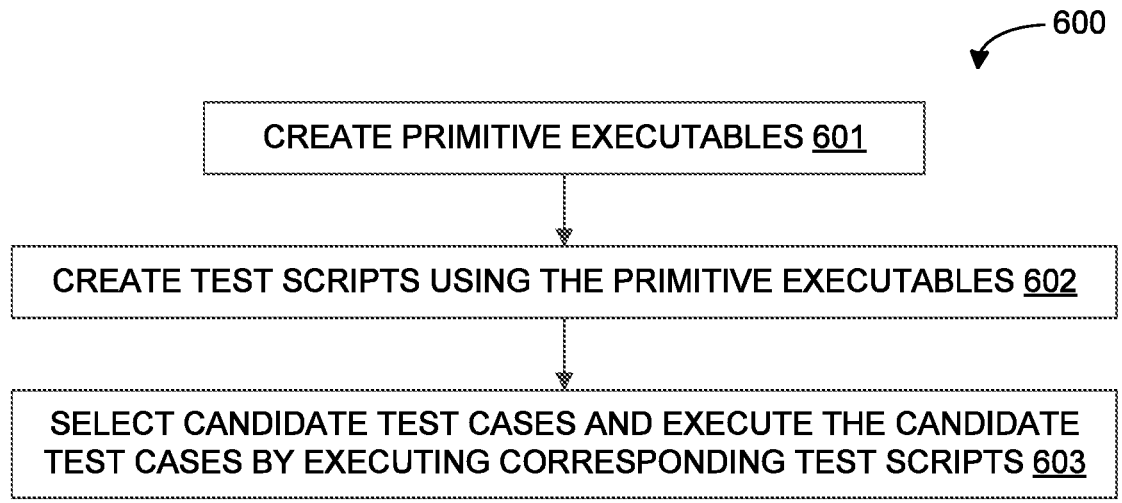

FIG. 6 is a flow diagram of an exemplary process overview for testing the HMI application on the target device, in accordance with some embodiments of the present disclosure.

Figure 7:
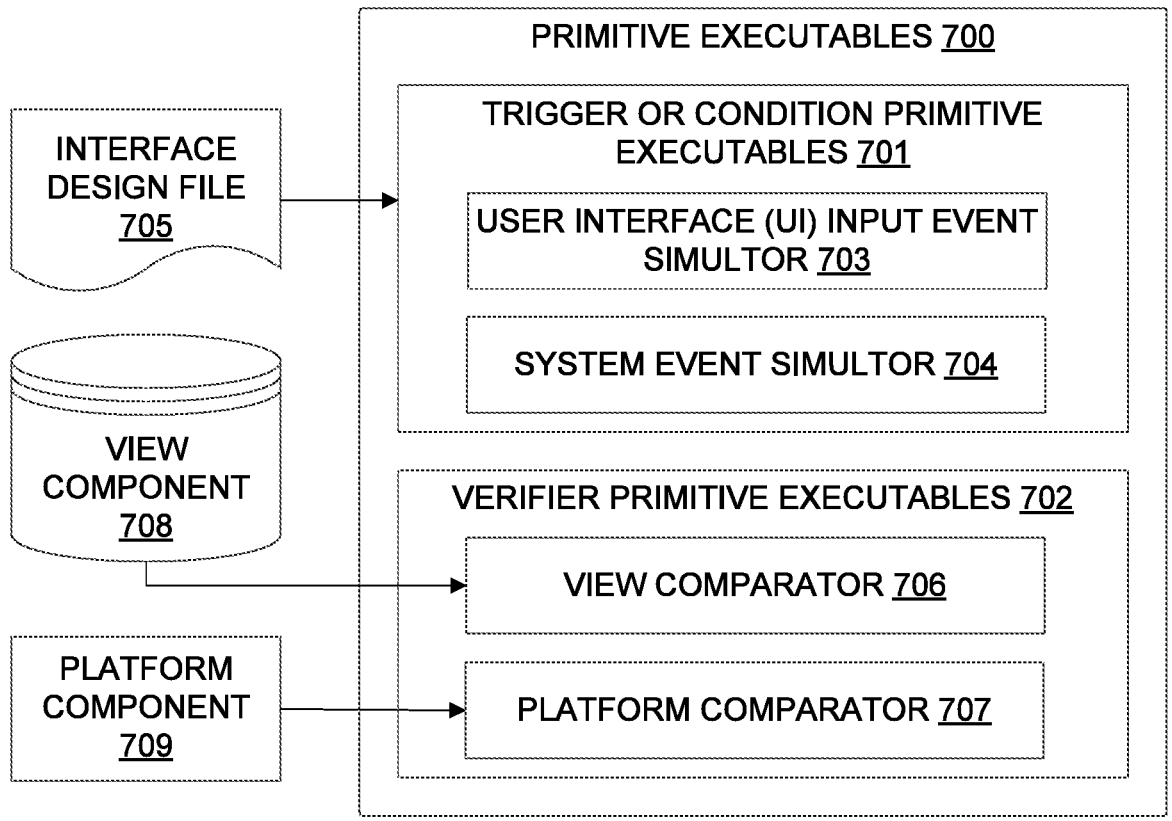

FIG. 7 is a schematic for creating primitive executables, in accordance with some embodiments of the present disclosure.

Figure 8:
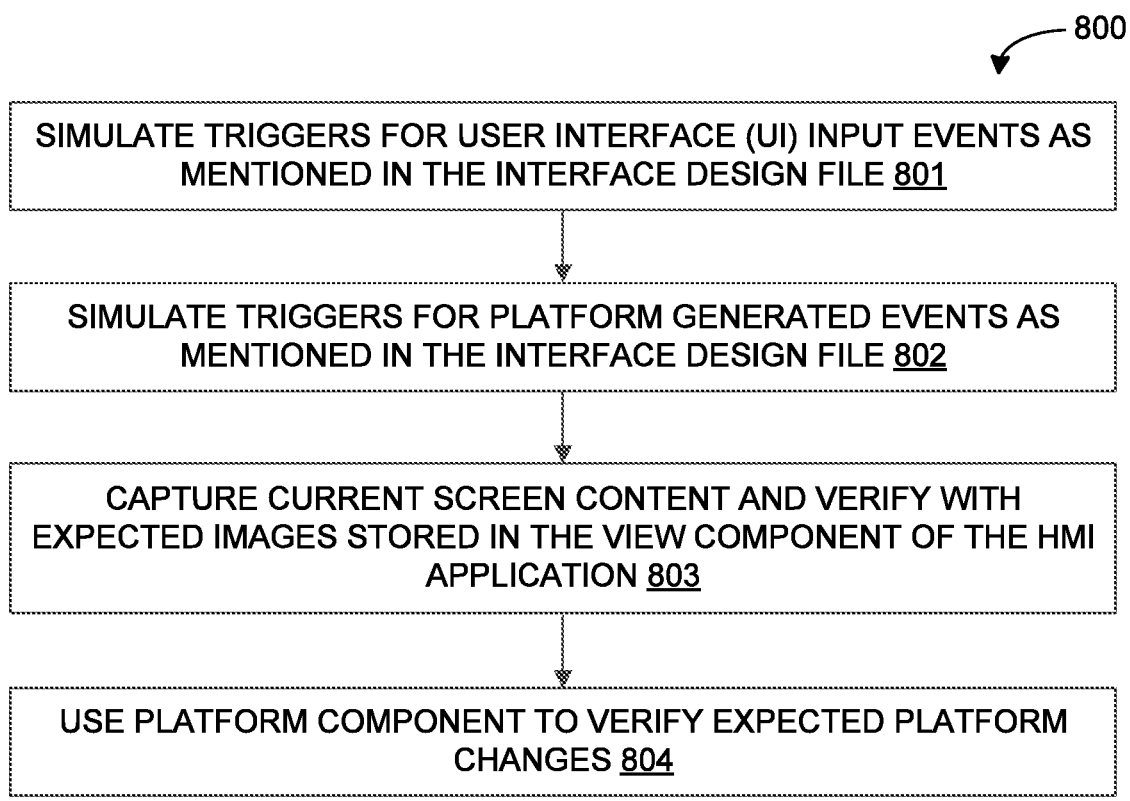

FIG. 8 is a flow diagram of an exemplary process overview for creating primitive executables, in accordance with some embodiments of the present disclosure.

Figure 9:
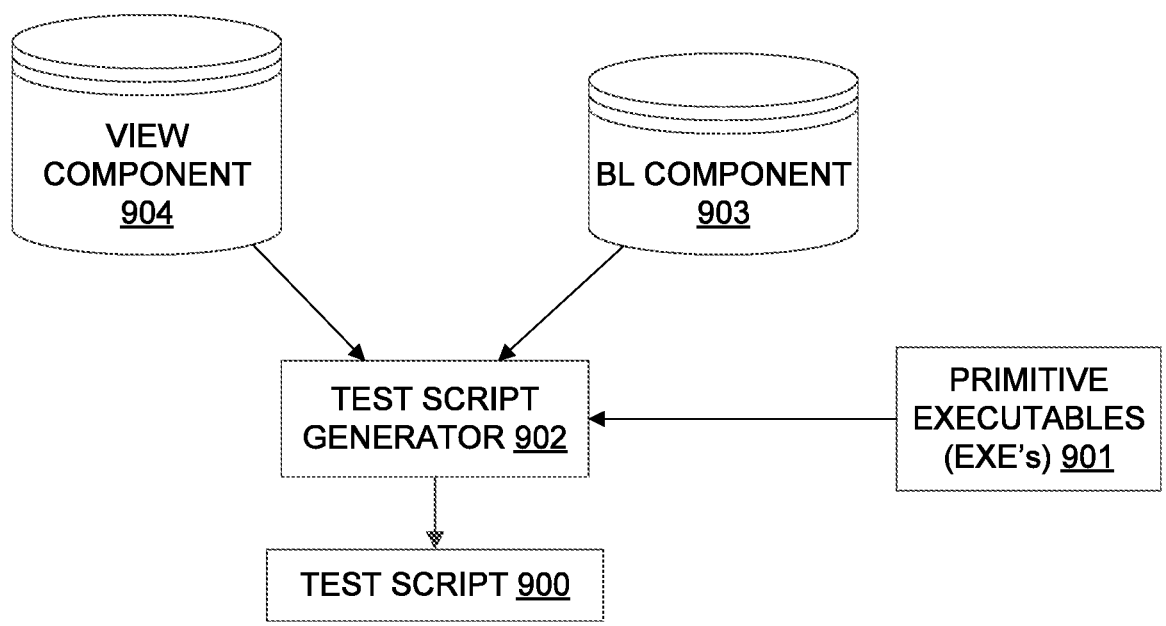

FIG. 9 is a schematic for automatically creating test scripts from primitive executables, in accordance with some embodiments of the present disclosure.

Figure 10:
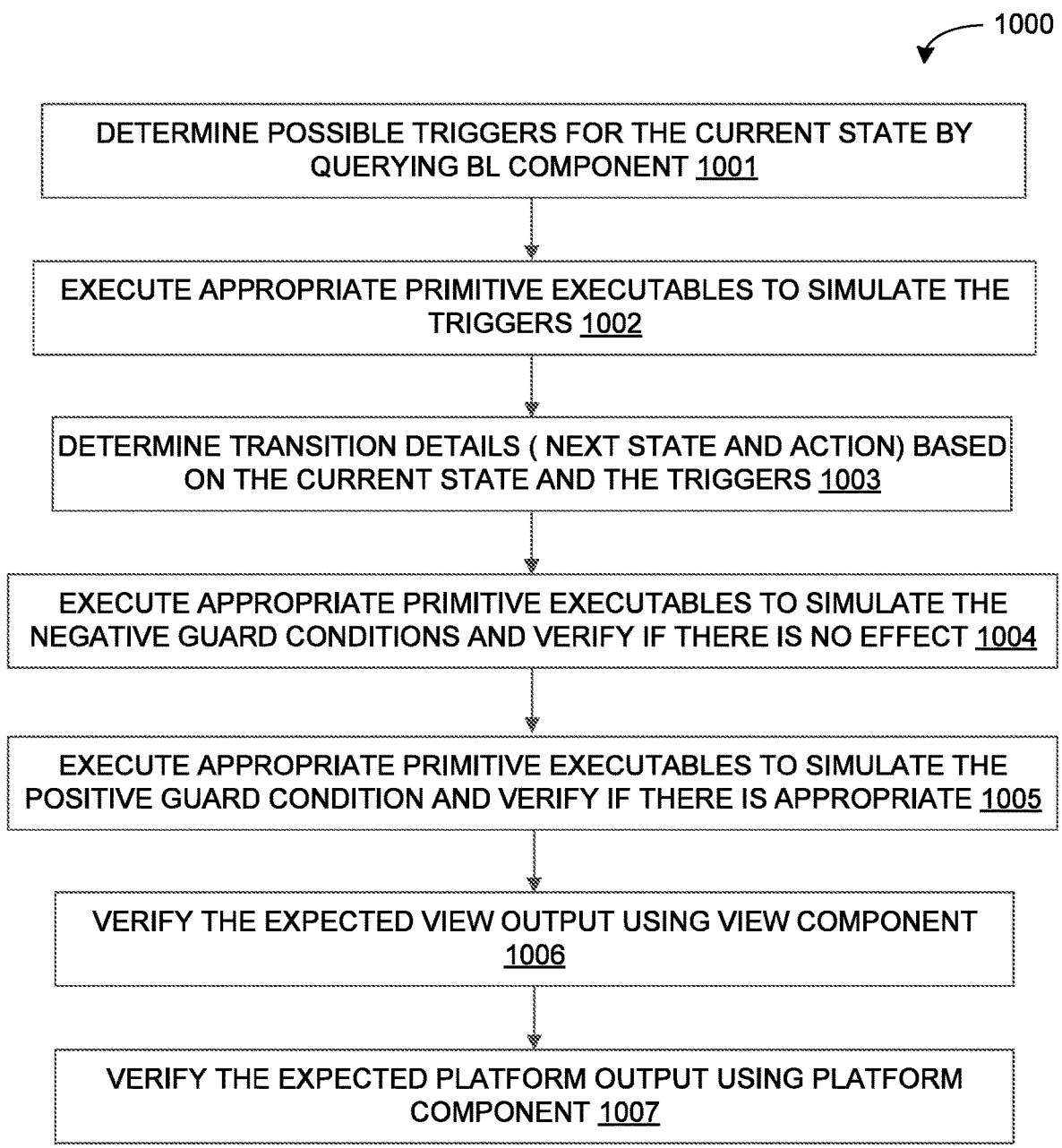

FIG. 10 is a flow diagram of an exemplary process overview for automatically creating test scripts from primitive executables, in accordance with some embodiments of the present disclosure.

FIG. 11 is a flow diagram of an exemplary process for testing the HMI application on the target device, in accordance with some embodiments of the present disclosure.

Figure 12:
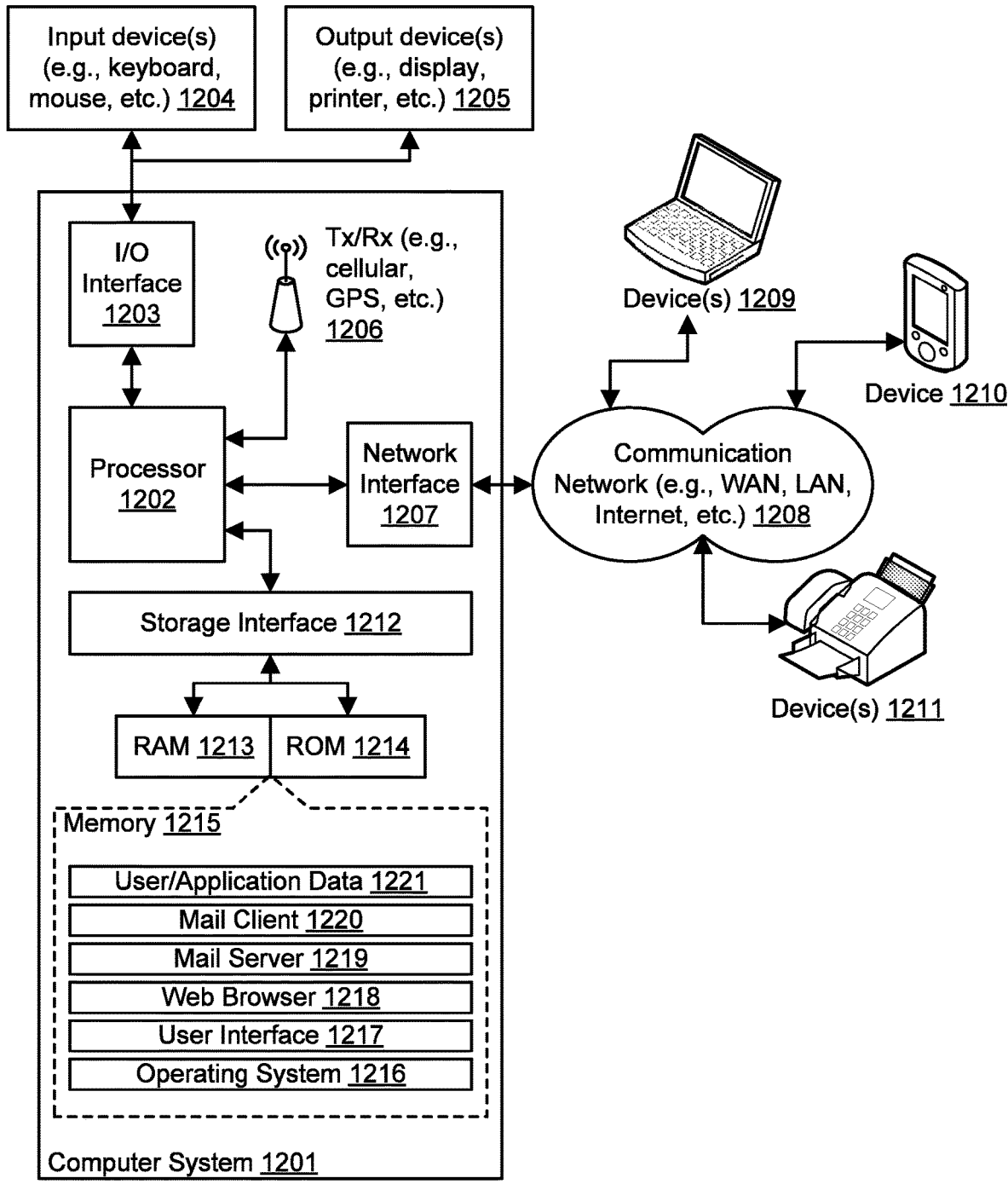

FIG. 12 is a block diagram of an exemplary computer system for implementing embodiments consistent with the present disclosure.

DETAILED DESCRIPTION OF THE INVENTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
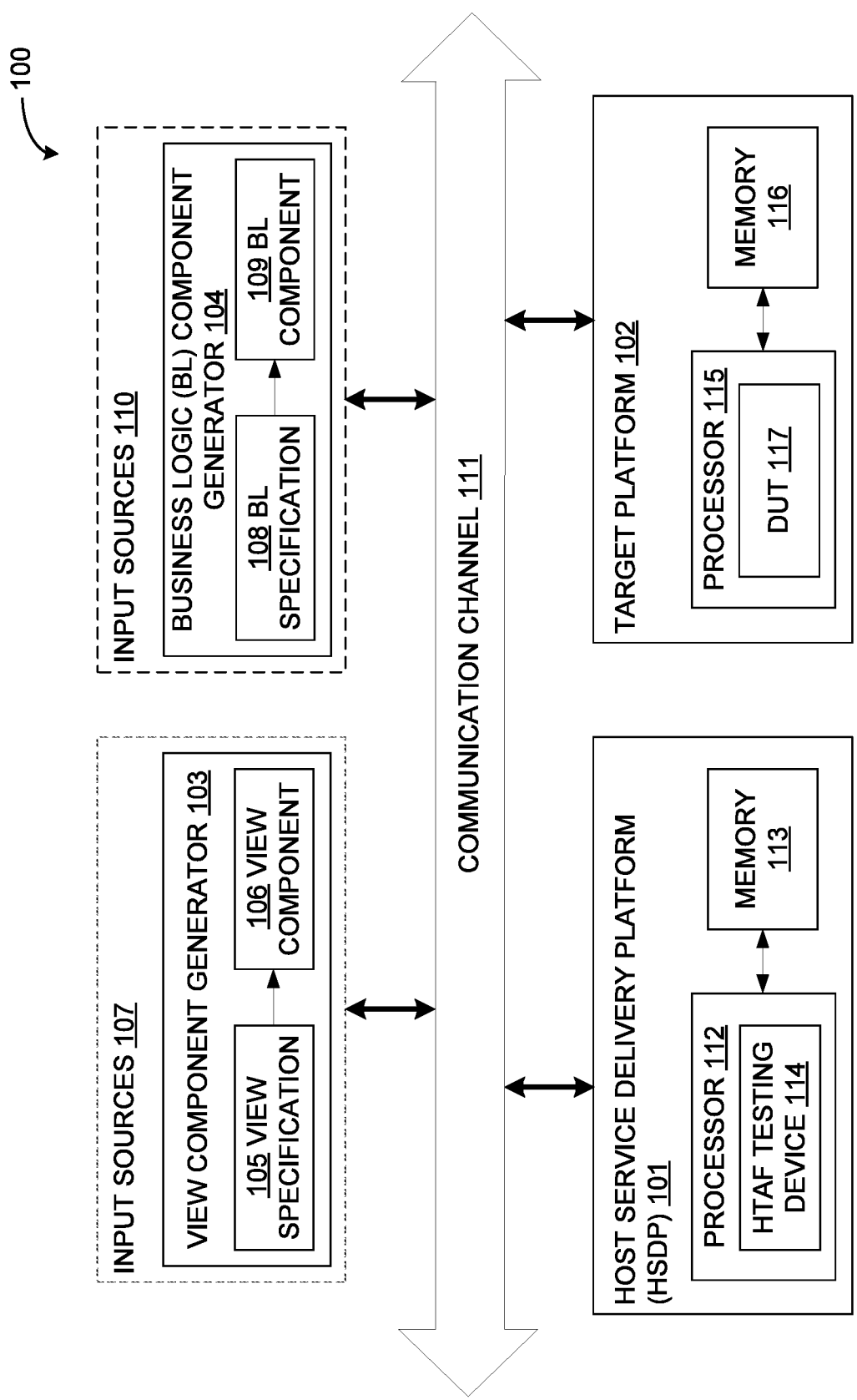
FIG. 1 is a block diagram of an exemplary system for developing and validating a human machine interface (HMI)

Referring now to FIG. 1, an exemplary system 100 for developing and validating a human machine interface (HMI) application is illustrated, in accordance with some embodiments of the present disclosure. As will be appreciated, the HMI application may be developed and validated on a host service delivery platform (HSDP) 101. The HMI application may then be delivered from the HSDP platform 101 to a target platform 102. In some embodiments, the system 100 may develop and deliver the HMI application from the HSDP platform 101 to the target platform 102 using a cloud-based service, also referred to as HMI as a Service (HaaS). Upon delivery, the HMI application may be implemented on the target platform 102. Further, upon implementation, the HMI application may be validated (that is, tested) on the target platform. Again, in some embodiments, the system 100 may validate or test the HMI application that has been implemented on the target platform 102 using a cloud-based service, also referred to as a HMI test automation framework (HTAF).

As will be appreciated, a typical HMI application may include various components, such as, a view component, a business logic (BL) component, a platform component, and so forth. The view component may be responsible for the look and feel of the HMI application and may provide a medium for a user to interact with the HMI application. The BL component may provide for control and functioning of the HMI application. For example, the BL component may be responsible for control and navigation action within the HMI application. The platform component may provide for platform specific services of the HMI application.

It should be noted that, in some embodiments, these components may be developed, validated, delivered, and deployed as modular components decoupled from each other, in accordance with some embodiments of the present disclosure, thereby enabling faster development, validation, delivery and deployment of the HMI application in a cost effective, efficient, and scalable manner. Further, in some embodiments, the system 100 may develop and deliver the HMI application from the HSDP 101 to the target platform 102 by developing and delivering each of the modular components (that is, the view component, the BL component, and the platform component) of the HMI application using HaaS. The system may further enable validating each of the modular components of the HMI application on the HSDP platform 101 and on the target platform 102. As will be appreciated, a new paradigm of testing may be required so as to handle modularity of the application (that is, to perform testing of each of the modular components of the HMI application independent of the other modular components).

The system 100 may include the HSDP platform 101, the target platform 102, a view component generator 103, and a BL component generator 104. The view component generator 103 may receive a view specification 105 for generating a view component 106 of the HMI application. In some embodiments, the view component generator 103 may generate the view component 106 by emulating the view specification 105 into a view database. It should be noted that the view component generator 103 may receive the view specification 105 from one or more input sources 107. The view component generator 103 may further store the received view specification 105 in a memory (not shown). Further, the view component generator 103 may employ a view component generation engine (not shown) for generating the view component 106. For example, in some embodiments, the view component generator 103 may employ a view database generation engine that may emulate the view specification 105 into the view database, which may be implemented in a view database schema and stored in the memory (not shown). The generation of view component 106, for example in form of view database, by the view component generator 103 has been described in pending Indian Patent Application No. 201841005971 by the Applicant, the contents of which are incorporated herein in their entirety by reference. In some embodiments, the view component generator 103 may include a user interface (not shown) that may allow user to create and preview the view prior to submitting the view specification 105 to the view component generation engine (not shown) for creating the view component 106.

The view component 106 may include a view information, an image information, and a string information. The view information may include information of view elements of the HMI application. The image information may include a list of images used in the HMI application, while the string information may include a list of strings used in the HMI application. As will be appreciated, for each view, the image of the screen may be stored. Referring now to FIG. 2, a schematic representation of an exemplary view information organization 200 in the view component 106 is illustrated, in accordance with some embodiments of the present disclosure. In particular, the view information 200 of the HMI application may include multiple screens (Scr), such as $Scr_1$, $Scr_2$, ... $Scr_i$ ($Scr_i$ representing the $i^{th}$ screen). Additionally, each of the screens may include multiple panels or containers (Cont), such as $Cont_{ij}$ ($Cont_{ij}$ representing the $j^{th}$ container of the $i^{th}$ screen). Further, each of the containers may include multiple widgets (Wid), such as $Wid_{ijk}$ ($Wid_{ijk}$ representing $k^{th}$ widget of $i^{th}$ container of $i^{th}$ screen). The widgets may include, but are not limited to, text box and button. It should be noted that each widget may have multiple properties (e.g., (x,y) coordinates, style attributes (e.g., font, color, bold, italics, etc), and so forth. Each widget may also be associated with a trigger that may be initiated for prompting and receiving user inputs in that widget. This trigger may then be passed to the BL component for further processing. Further, it should be noted that the container may include a child container. Additionally, the view component 106 may also include a view image that may be employed for test automation purpose. Further, the view component 106 may provide for the query information interface to obtain details of any screen elements. As will be appreciated, the view component 106 may use the query interface to obtain the information and render the screen.

Referring back to FIG. 1, the BL component generator 104 may receive a BL specification 108 for generating a BL component 109 of the HMI application. As mentioned above, the BL component generator 104 may receive the BL specification 108 from one or more input sources 110 and store the same in a memory (not shown). Further, the BL component generator 104 may employ a BL component generation engine (not shown) for generating the BL component 109 from the BL specification 108. In some embodiments, the BL component 109 may be generated by emulating the BL specification 108 into a BL database. In such embodiments, the BL component generator 104 may employ a BL database generation engine so as to emulate the BL specification 108 into the BL database, which may be implemented in a BL database schema and stored in the memory (not shown). The generation of BL component 109, for example in form of BL database, by the BL component generator 104 has been described in pending Indian Patent Application No. 201841005780 by the Applicant, the contents of which are incorporated herein in their entirety by reference. It should be noted that, in some embodiments, the original equipment manufacturer (OEM) may provide the BL specification 108 to the BL component generator 104 in a paper format. Further, in some embodiments, the BL database generator 104 may include a modeling tool (not shown) for modeling the BL specification 108 to be implemented on the target platform 102.

Referring now to FIG. 3, a tabular representation of an exemplary BL information organization 300 in the BL component 109 is illustrated, in accordance with some embodiments of the present disclosure. The BL component 109 may include a set of states. Each of the states may further include various functions, such as 'Entry' function, 'Do' function, 'Exit' function, and 'Transition' function. The 'Entry' function may be executed during a transition from other state to a current state. The 'Do' function may be executed for doing any continuous processing that may be needed for the current state. The 'Exit' function may be executed during a transition to other state from the current state. Typically, while moving from 'state A' to 'state B', 'Exit' function of 'state A' and 'Entry' function of 'state B' may be called for performing finalization and initialization activities. The 'Do' function may be used for performing state specific processing. The 'Transition' function may include additional details for each of the triggers. For example, for each trigger, the 'Transition' function may include a 'Guard' condition, an 'Action' function, and a 'Next' state. The 'Guard' condition may relate to a condition that may be evaluated before taking a particular action. The Action function may relate to a function that may be executed upon fulfillment of the 'Guard' condition. The 'Next' state may relate to a name of the next state upon completion of the 'Action' function.

Referring back to FIG. 1, the HSDP 101 may be communicatively coupled to the view component generator 103 and the BL component generator 104 via a communication channel 111. The HSDP 101 may further be communicatively coupled to the target platform 102 via the communication channel 111. The communication channel may be any wired or wireless communication network (e.g., local area network (LAN), wireless LAN (WLAN), wide area network (WAN), Internet, etc.) or a wired or wireless communication medium (e.g., serial port, universal serial bus (USB), Bluetooth, etc.). In some embodiments, the HSDP 101 may receive the view component 106 from the view component generator 103 and the BL component 109 from the BL component generator 104. The HSDP 101 may then validate each of these modular components (that is, the view component 106 and the BL component 110). Additionally, the HSDP 101 may develop and validate the platform component of the HMI application. Further, the HSDP 101 may deliver the HMI application to the target platform 102 by delivering the modular components (that is, the view component 106, the BL component 109, and the platform component). The HSDP 101 may also validate each of the modular components (that is, the view component 106, the BL component 110, and the platform component) of the HMI application deployed on the target platform 102. Thus, the HSDP 101 may act as a cloud service platform for delivering the modular components of the HMI application to the target platform 102 and for validating the modular components of the HMI application on the target platform 102.

It should be noted that, in some embodiments, the view component generator 103 and the BL component generator 104 may be implemented within the HSDP 101. Thus, the HSDP 101 may generate the view component 106 (using the view component generation engine) and the BL component (using the BL component generation engine) from the view specification and the BL specification, respectively. In such embodiments, the system 100 may include the HSDP 101 and the target platform 102.

The HSDP 101 may include a processor 112 and a memory 113 for implementing the HMI service for delivering the HMI application to the target platform 102, as well as for implementing the HMI testing framework (that is, HTAF) for testing the HMI application deployed on the target platform. In particular, as will be described in greater detail in conjunction with FIGS. 5-11, the HSDP 101 may provide for HTAF testing device 114 for performing automated testing of the HMI application, in accordance with some embodiments of the present disclosure. Additionally, the HSDP 101 may provide for modular testing kits (not shown) for performing automated testing of corresponding modular components of the HMI application. For example, the modular testing kits may include a view testing kit (VTK) for testing the view component 106, a BL testing kit (BTK) for testing the BL component 109, and a platform testing kit (PTK) for testing the platform component of the HMI application. These modular testing kits may facilitate testing of corresponding modular components of the HMI application without the need for the other modular components. It should be noted that the modular testing kits (not shown) may perform white box testing (that is, testing internal structure or working of each line) of the corresponding modular components of the HMI application, while the HTAF testing device 114 may perform black box testing (that is, testing overall functionality) of the HMI application. The development of modular testing kits for testing corresponding modular components of the HMI application has been described in pending Indian Patent Application No. 201841010434 by the Applicant, the contents of which are incorporated herein in their entirety by reference.

The target platform 102 may receive the HMI application and any validation scripts (that is, test scripts) from the HSDP 101 over the communication network 111. The target platform 102 may include a processor 115 and a memory 116. The processor may further include a device under test (DUT) component 117. As will be described in greater detail in conjunction to FIG. 4, the DUT 117 may provide for a scalable architecture by way of loosely coupled view component, BL component, platform component.

Referring now to FIG. 4, a functional block diagram of an exemplary DUT 400, analogous to the DUT 117 of FIG. 1, is illustrated in accordance with some embodiments of the present disclosure. The DUT may also be referred to as target device or target platform and may be used interchangeably throughout the document. The DUT 400 may include a view client 401, a View-BL-Interface (VBI) 402, a BL client 403, a service access layer (SAL) 404, and a platform 405. The view client 401 may be a thin client for visualizing the HMI application screen based on the view component. The BL client 403 may be a thin client for executing control logic, based on the BL component, for control and functioning of the HMI application. The VBI 402 may be an interface between the view client 401 and the BL client 403, and may be defined using an XML schema. Further, the VBI 402 may decouple the view client 401 from the BL client 403. In some embodiments, the VBI 402 may further include a BL-view interface 406 and a view-BL interface 407. As will be appreciated, the BL-view interface 406 may act as a BL command processor and may translate inputs from the BL client 403 for the view client 401. Similarly, the view-BL interface 407 may act as a view command processor and may translate inputs from the view client 401 for the BL client 403. Thus, for example, the user interface (UI) input received by the view client 401 may be communicated to the BL client 403 via the view-BL interface 407. Further, the view client 401 may receive the input from the BL client 403 via the BL-view interface 406.

The platform 405 may include platform specific services encapsulated in a platform layer. As will be appreciated, the platform services may be executed based on the platform component. The SAL 404 may be an interface that may decouple the BL client 403 from the platform 405. It should be noted that the SAL 404 may use an XML based schema to define the interface between the BL client 403 and the platform 405. In some embodiments, the SAL 404 may further include a BL-platform interface 408 and a platform-BL interface 409. As will be appreciated, the BL-platform interface 408 may act as a BL command processor and may translate inputs from the BL client 403 for the platform 405. Similarly, the platform-BL interface 409 may act as a platform command processor and may translate inputs from the platform 405 for the BL client 403.

It should be noted that, in some embodiments, the DUT 400 may also include a database (not shown) that may further include the view component, the BL component, and the platform component received from the HSDP platform and installed on the DUT 400. In some embodiments, the database may further include a query interface to execute queries from the view client 401 and the BL client 403 against the respective view component (for example, view database) and the BL component (for example, BL database). Moreover, the database may include a device synchronization interface (DSI) that may enable the target platform to synchronize the view component and the BL component with any updates that may be available from the HSDP 101.

It should be noted that the above discussed subsystems (HSDP platform 101, target platform 102, view component generator 103, BL component generator 104, DUT 119, 400, etc.) and their modules, circuitry, etc. may be implemented in programmable hardware devices such as programmable gate arrays, programmable array logic, programmable logic devices, and so forth. Alternatively, the subsystems, circuitry, and modules may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

Referring now to FIG. 5, a block diagram of an exemplary HTAF 500 for testing the HMI application on the target device is illustrated, in accordance with some embodiments of the present disclosure. As will be appreciated, the HTAF 500 may include a testing device 501 remote from one or more target devices 502 to be tested. The target device 502 may also be referred to as device under test (DUT). The testing device 501 may include a test suite 503, a user interface 504, and a test agent 505. The test suite 503 may include a number of primitive executables 506 (EXE's), a number of test scripts 507 corresponding to various test cases for testing the target devices 502, and test reports 508. The target device 502 may include a device agent 509 that executes one or more primitive executables 510 ($EXE_1$, $EXE_2$, ... $EXE_n$) received from the test agent 505 by interacting with various components 511 ($COMP_1$, $COMP_p$, ... $COMP_t$, $COMP_n$) in the target device 502.

The primitive executables 506 are executables corresponding to various atomic operations required to be performed on the target device 502. As will be described in greater detail in conjunction with FIGS. 7-8, the primitive executables 506 may be manually or automatically created to perform various atomic operations fairly independent of each other. The atomic operations, for the validation of the HMI application on the target device 502, may include, but may not be limited to, simulation of triggers for user interface (UI) input event (e.g., touch event, keyboard event, etc.) and system event (e.g., Bluetooth device available indication, etc.) in BL component of the HMI application, simulation of guard condition (both positive and negative) defined in the BL component, and verification of output using view component and platform component. It should be noted that the primitive executables may be specific to the target device.

Each of the test scripts 507 may correspond to a test case for testing a given target device 502. As will be appreciated, the test case may vary based on the target device 502. As will be described in greater detail in conjunction with FIGS. 9-10, the test script 507 may be automatically generated using a right set of primitive executables 506 corresponding to a set of steps in the test script 507. For example, the test script 507 may be automatically generated based on the trigger-guard-action information available for each state in the BL component. Thus, the test script 507 may evaluate the test case by executing primitive executables 506, and by comparing the result with expected result mentioned in test case. For example, the outcome of the test script execution may be verified with the expected view image available from the view component of the HMI application. Further, each of the test reports 508 is a result of execution of a test script 507 (i.e., related primitive executables 506).

The user interface 504 may enable the user (e.g., tester) to upload the test cases. The user interface 504 may further enable the user to group the test cases so that a set of test cases may be executed based on a scenario (e.g., stress, regression etc.). Additionally, the user interface 504 may enable the user to upload or create primitive executables 506 specific to the target device 502. Further, the user interface 504 may enable the user to trigger automatic creation of test scripts 507 corresponding to the test case. Alternatively, the user interface 504 may enable the user to manually create test scripts using an appropriate set of primitive executables 506. The user interface 504 may also enable the user to generate the test report based on the result of test execution. In some embodiments, the user may view or export the test report in .xls, .doc, .pdf, or any other pre-defined or user selected format.

The test agent 505 may interact with one or more target devices 502 via corresponding device agents 509 using any simple request-response protocol. For example, the test agent 505 may communicate with one or more device agents 509 using an efficient, effective, and light weight protocol such as a light weight device validation (LWDV) protocol. The LWDV protocol has been described in co-pending Indian Patent Application No. 201741007260 by the Applicant, the contents of which are incorporated herein in their entirety by reference. In some embodiments, the test agent 505 may communicate with the device agent 509 of the target device 502 via a test Transport Protocol (TP) that acts as a bearer for the communication with the device agent 509. It should be noted that, in some embodiments, the test agent 505 and corresponding test TP may be a part of intermediary test host (not shown) that may be deployed in a personal computer (PC). In such embodiments, a PC simulation may be performed by developing reference view, BL, and platform components for an operating system (e.g., WINDOWS) of the PC based on view, BL, and platform integration method in the target device respectively. It should be noted that the PC simulation may be made available in HSDP so that entire flow may be verified before deploying it in the target device.

As will be appreciated, a scheduler 512 may trigger a test session to perform the testing on the target device 502. In some embodiments, the scheduler 512 may first select an appropriate test suite 503 or appropriate test cases from the test suite 503 using the user interface 504. The scheduler 512 may then select the target device 502 using the user interface 504. Upon selection, the scheduler 512 may trigger a test session via the test agent 505. The test agent 505 may access the primitive executables 506 corresponding to the test script 507 which in turn may correspond to the selected test case. The test agent 505 may then provide the primitive executables 506 to the device agent 509 of the selected target device 502 for execution. The test cases may therefore be executed on the target device 502 as per the instruction from the test agent 505. The test agent 505 may further receive the result of execution of the primitive executables 506 from the target device 502, and may compile the same to determine the result of execution of the test script 507. The result may be provided to the test suite 503 as test report 508.

The device agent 509 in each of the target device 502 may communicate with the test agent 505 of the testing device 501 or of the intermediary test host (not shown). In some embodiments, the device agent 509 may communicate with the test agent 505 via a device TP that may act as a bearer for the communication with the test agent 505. The device agent 509 may execute the commands received from the test agent 505. Thus, the device agent 509 may execute the primitive executable, corresponding to the test script of the selected test case, on the target device 502 as per the instructions received from the test agent 505. The device agent 509 may receive a set of primitive executables 510 corresponding to a test script of a selected test case, and may execute the same by interacting with various components 511 in the target device 502. The device agent 509 may further provide result of execution of the primitive executables 510 to the test agent 505. Additionally, the device agent 509 may determine availability of computing resources in the target device 502, and may intimate the test agent 505 of the same. As will be appreciated, the determination of the availability may be performed at periodic interval, or upon request by the test agent 505 at run time. The periodicity may be pre-defined by the user or by the testing system 501 based on the nature of the target device 502.

Thus, each test script 507 may be composed of a set of primitive atomic operations. To execute these atomic operations appropriate primitive executables 506 may be developed for each such operation. The test agent 505 may execute the test scripts by sending the right set of primitive executables 506 to the device agent 509 for performing the corresponding operations. As will be appreciated, the primitive executables are smaller in size, and may interact with components 511 of the target device 502. The test agent 505 may consider availability of resource in runtime and sequence the test executions to overcome any resource constraint at run time while ensuring optimum test execution time and component coverage.

By way of example, the user may upload test cases specific to the target device 502 via the user interface 504. Additionally, as stated above, the user may create or upload multiple primitive executables 506, mutually independent of each other and specific to the target device 502, via the user interface 504. The testing system 501 may then automatically create test scripts 507 corresponding to test cases using right set of primitive executables 506. During operation, the test agent 505 may receive a request for performing test on a given target device 502 from the scheduler 512. Upon reception of request from the scheduler 512, the test agent 505 may access primitive executables related to the test script 507 for the given target device 502, and may provide the same to the device agent 509 for execution. The test agent 505 may, first, determine availability of computing resources on the given target device 502 through the device agent 509. The test agent 505 may then provide the related primitive executables to the device agent 509 in sequence or in batches based on resource availability in the target device 502. The device agent 509 may execute the test script 507 by executing the related primitive executables 510 as received, and may provide the result of execution back to the test agent 505. The test agent 505 may receive the results of execution of primitive executables 510 upon each execution, and may aggregate the same once the results of execution of all primitive executables have been received so as to determine the result of execution of the test script 507 on the target device 502. The test agent 505 may then provide the result of execution of the test script 507 as test report 508.

As will be appreciated by those skilled in the art, the techniques described in the embodiments discussed above provide for an optimized, efficient, and cost effective mechanism for testing HMI application on the target devices. The testing techniques described above have low footprint (i.e., reduced resource usage and reduced computational load) on the target device being tested, thereby reducing the load on the target device. Additionally, the techniques described in the various embodiments discussed above reduce the probability of failure of test case execution on a device since the test case execution are sequenced based on the resource available at target device on run time and estimated resource usage by the primitive executables. Further, the techniques provide for automating the test cases using view component and BL component so as to keep the techniques in synchronization with requirement changes.

The techniques described in the various embodiments discussed above are therefore suitable for testing HMI applications on the resource constrained devices such as miniature computing devices. The miniature computing devices may include, but are not limited to, activity trackers, smart watches, smart glass, smart sensors, in-vehicle infotainment system, miniature plug-and-play devices, miniature storage solutions, Internet of Things (IoT) devices, and other wearable devices. These miniature devices may run one or more real-time HMI applications over a light-weight and optimized operating system (e.g., Windows 10 IoT, Google Brillio, RIOT OS, etc.).

Referring now to FIG. 6, an overview of exemplary process 600 for testing the HMI application on the target device is depicted via a flowchart, in accordance with some embodiments of the present disclosure. The process 600 may involve the steps of creating primitive executables at step 601, creating test scripts using the primitive executables at step 602, and selecting and executing candidate test cases by executing corresponding test scripts at step 603. In some embodiments, the process 600 may further involve the step of developing PC simulation. Each of these steps will be described in greater detail herein below.

At step 601, the process 600 may identify a set of atomic operations required to be performed on the target device (i.e., device under test) for the validation of the HMI application. The atomic operations may include, but may not be limited to, simulation of triggers for UI input event and system event in the BL component as mentioned in the interface design file (IDF), simulation of guard condition in the BL component as mentioned in the IDF, and verification of output using view component and platform component. As will be described in greater detail in conjunction with FIGS. 7-8, the process 600 may then create or enable creation of primitive executables corresponding to the identified atomic operations. Each of the primitive executables may execute fairly independent of other primitive executables so as perform corresponding atomic operation. Additionally, the process 600 may estimate resource usage requirement (e.g., memory, million instructions per second (MIPS), etc.) for each of the primitive executables. The process 600 may then enable the user (e.g., developer, tester, etc.) to upload aforementioned well tested primitive executables into a repository along with following execution parameters: name of the primitive executables, input parameters (e.g., parameters for invocation), output parameters, reporting format (i.e., response format for the output), estimated time for execution, estimated resource usage, estimated component coverage, and so forth. As will be appreciated, the test agent may subsequently refer the repository so as to access the primitive executables.

At step 602, the process 600 may automatically create or enable automatic creation of test scripts using primitive executables created at step 601. It should be noted that the test scripts correspond to test cases. As will be described in greater detail in conjunction with FIGS. 9-10, the process 600 may determine various possible triggers, transition details, and conditions for the test script by querying the BL component of the HMI application. The process 600 may then determine one or more primitive executables for simulating each of the possible triggers, transition details, and conditions. Additionally, the process 600 may determine one or more primitive executable for verifying the expected output with respect to the view component and the platform component of the HMI application. It should be noted that the intended objective of a test script should be typically achieved by executing one or more primitive executables. As will be appreciated, the list of primitive executables to be executed for the test script may be identified along with their corresponding input parameters so as to perform the execution. Further, each executables may be identified along with its predecessor executables if it has dependencies. Additionally, the process 600 may identify one or more primitive executables that may be executed in batch and that has no dependencies. As will be appreciated, multiple primitive executables may run in parallel if they are not dependent. This will improve the test execution process. The result (i.e.; PASS/FAIL) of the test script may be computed, and test report may be generated or updated based on the result for execution of each of the primitive executables corresponding to the test script.

At step 603, the process 600 may select candidate test cases for testing the HMI application on a given target device. The process 600 may then execute the selected test cases by executing corresponding test scripts via the test agent. The process 600 may access a test script corresponding to a selected test case. The process 600 may then check for the available resources in the target device. The availability of resources in the target device may be determined by the test agent based on the information received from the device agent of the target device. The device agent reports about the available resources in the target device at a periodic interval or at run time. If the target device has enough resources, the process 600 may then transmit the primitive executables related to the selected test script to the target device for execution. Thus, the test agent pushes one or more of the primitive executables related to the test script to the device agent in the target device. In some embodiments, the test agent pushes the primitive executables to the device agent in batches. The transmission may be over a serial or parallel communication channel, or over a wired or wireless communication network. As will be appreciated, the transmission may be performed based on the availability. Thus, the one or more of the primitive executables are transmitted only if the target device has enough resources at run time.

The device agent may execute the received primitive executables and may send the result to the test agent upon execution. The test agent may receive the result from the device agent and computes the intermediate result. The above process is repeated until all primitive executables related to the test script (i.e., all test steps of the test scripts) has been executed. A final result may then be computed by the test agent based on the intermediate result received on each step. The final result may then be stored as test report in the repository and/or rendered to the user.

As stated above, in some embodiments, the process 600 may deploy the test host (i.e., test agent and test TP) in a PC (e.g., WINDOWS PC). In such embodiments, the process 600 may develop a PC simulation. The process 600 may develop reference view for an operating system (e.g., WINDOWS) of the PC based on a view integration method in the target device. Similarly, the process 600 may develop reference BL for the operating system of the PC based on BL integration method in the target device. Further, the process 600 may develop reference platform for the operating system of the PC based on platform integration method in the target device. It should be noted that the PC Simulation may be available in HSDP so that entire flow may be verified before deploying it in the target device.

Referring now to FIG. 7, a schematic for creating primitive executables 700 by the testing device 501 is illustrated, in accordance with some embodiments of the present disclosure. As will be appreciated, the primitive executables 700 may include trigger or condition primitive executables 701 and verifier primitive executables 702. The trigger or condition primitive executables 701 may simulate triggers or conditions corresponding to a business logic (BL) component of the HMI application, while the verifier primitive executables 702 may verify outputs using view component or platform component of the HMI application.

The testing device 501 may include a user interface (UI) input event simulator 703 for simulating triggers for UI input events, and a system event simulator 704 for simulating triggers for system events (i.e., platform generated events) and for simulating guard conditions. The UI input event simulator 703 may simulate triggers for UI input events as mentioned in the interface design (IDF) file 705. Example of UI input event may include, but may not be limited to, touch event, and keyboard event. Similarly, the system event simulator 704 may simulate triggers for system events as mentioned in the IDF file 705. Example of system events may include, but may not be limited to, Bluetooth device available indication. The system event simulator 704 may also simulate positive and negative guard conditions as mentioned in the IDF file 705.

The testing device 501 may further include a view comparator 706 for verifying output using view component 708, and a platform comparator 707 for verifying output using platform component 709. The view comparator 706 may capture current screen content and verify the same with expected images stored in the view component 708 of the HMI application. Similarly, the platform comparator 707 may use platform services defined in the platform component 709 of the HMI application to verify expected platform changes.

Referring now to FIG. 8, an overview of exemplary process 800 for creating primitive executables is depicted via a flowchart, in accordance with some embodiments of the present disclosure. The process 800 may involve the steps of simulating triggers for UI input events as mentioned in the IDF at step 801, simulating triggers for platform generated events or system events as mentioned in the IDF at step 802, capturing current screen content and verifying with expected images stored in the view component of the HMI application at step 803, and using platform component to verify expected platform changes at step 804.

Referring now to FIG. 9, a schematic for automatically creating test scripts 900 from primitive executables 901 by the testing device 501 is illustrated, in accordance with some embodiments of the present disclosure. The testing device 501 may employ a test script generator 902 for automatically creating of test scripts 900 from the primitive executables 901. The test generator 902 may determine possible triggers for the current state by querying the BL component 903 and may execute a first subset of appropriate primitive executable 901 so as to simulate the trigger. Further, the test generator 902 may determine transition details (i.e., next state and action) based on the current state and the triggers. The test generator 901 may then execute a second subset of appropriate primitive executable 901 so as to simulate negative guard condition and may verify if there is an appropriate effect on an outcome (i.e., negative outcome) of an execution of the test script or if there is no outcome. The test generator 901 may further execute a third subset of appropriate primitive executable 901 so as to simulate positive guard condition and may verify if there is an appropriate effect on the outcome (i.e., positive outcome) of the execution of the test script. Additionally, the test generator 901 may verify the expected view output using view component 904. For example, the test generator 901 may verify the expected view output with reference scene image stored in the view component of the HMI application. Similarly, the test generator 901 may verify the expected platform output using platform component.

Referring now to FIG. 10, an overview of exemplary process 1000 for automatically creating test scripts from primitive executables is depicted via a flowchart, in accordance with some embodiments of the present disclosure. The process 1000 may involve the steps of determining possible triggers for the current state by querying the BL component at step 1001, executing a first subset of appropriate primitive executables to simulate the triggers at step 1002, determining transition details (i.e., next state and action) based on the current state and the triggers at step 1003, executing a second subset of appropriate primitive executables to simulate the negative guard conditions and verifying if there is an appropriate effect on an outcome (i.e., negative outcome) of an execution of the test script or if there is no outcome at step 1004, and executing a third subset of appropriate primitive executables to simulate the positive guard conditions and verifying if there is an appropriate effect on the outcome (i.e., positive outcome) of the execution of the test script at step 1005. The process 1000 may further involve the steps of verifying the expected view output using view component at step 1006, and verifying the expected platform output using platform component at step 1007.

As will be appreciated by one skilled in the art, a variety of processes may be employed for testing the HMI application on the target device. For example, the exemplary system 100 may provide for testing of the HMI application on the target device by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the HSDP 101 to perform some or all of the techniques described herein. Similarly application specific integrated circuits (ASICs) configured to perform some or all of the processes described herein may be included in the one or more processors on the HSDP 101.

For example, referring now to FIG. 11, exemplary control logic 1100 for testing the HMI application on the target device in a system, such as the system 100, is depicted via a flowchart in accordance with some embodiments of the present disclosure. As illustrated in the flowchart, the control logic 1100 may include the step of accessing a test script corresponding to a test case for testing the HMI application on the target device at step 1101. The test script may include a set of mutually independent primitive executables. Further, each of the set of primitive executables may be configured to simulate at least one of a trigger or a condition corresponding to a business logic (BL) component of the HMI application and to verify an output using at least one of a view component or a platform component of the HMI application. The control logic 1100 may further include the steps of transmitting each of the set of primitive executables to the target device for execution at step 1102, and receiving a result corresponding to the execution of the each of the set of primitive executables at step 1103.

In some embodiments, each of the set of primitive executables may be configured to simulate the trigger for at least one a user interface (UI) input or a system event in the BL component of the HMI application. Additionally, in some embodiments, each of the set of primitive executables may be configured to simulate the condition corresponding to a guard condition defined in the BL component of the HMI application.

In some embodiments, the control logic 1100 may further include the step of creating each of a plurality of primitive executables by simulating, based on a definition of each of a set of interfaces configured to implement the BL component of the HMI application on the target device, at least one of the trigger or the condition corresponding to the BL component of the HMI application, and verifying the output using at least one of the view component or the platform component of the HMI application. In such embodiments, the control logic 1100 may further include the step of creating each of a plurality of primitive executables by determining a plurality of executable execution parameters for each of the plurality of primitive executables, wherein each of the plurality of executable execution parameters comprises at least one of a name of the primitive executable, a plurality of input parameters, a plurality of output parameters, a response format for an output, an estimated time of execution, an estimated usage of one or more resources of the target device, and a coverage of one or more components of the target device.

In some embodiments, the control logic 1100 may further include the step of automatically generating the test script by determining the set of primitive executables from among a plurality of primitive executables based on trigger-guard-action information available for each state in the BL component of the HMI application. In such embodiments, determining the set of primitive executables from among the plurality of primitive executables may include the steps of determining a possible trigger for a current state by querying the BL component of the HMI application, executing a first subset of appropriate primitive executables to simulate the possible trigger, determining next state based on the current state and the possible trigger, executing a second subset of appropriate primitive executables to simulate a negative condition and verifying if there is an appropriate effect on an outcome (i.e., negative outcome) of an execution of the test script or if there is no outcome, executing a third subset of appropriate primitive executables to simulate a positive condition and verifying if there is an appropriate effect on the outcome (i.e., positive outcome) of the execution of the test script, and verifying the outcome of the execution of the test script using at least one of the view component or the platform component of the HMI application.

In some embodiments, transmitting each of the set of primitive executables for execution at step 1102 may further include the steps of determining an availability of each of one or more resources in the target device, and transmitting each of the set of primitive executables to the target device based on the availability. Additionally, in some embodiments, the control logic 1100 may further include the steps of determining an outcome of an execution of the test script based on the result corresponding to the execution of the each of the set of primitive executables, and verifying the outcome of the execution of the test script with the expected view image available in the BL component of the HMI application.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific control logics.

The disclosed methods and systems may be implemented on a conventional or a general-purpose computer system, such as a personal computer (PC) or server computer. Referring now to FIG. 12, a block diagram of an exemplary computer system 1201 for implementing embodiments consistent with the present disclosure is illustrated. Variations of computer system 1201 may be used for implementing system 100, HSDP 101, target platform 102, view component generator 103, and BL component generator 104 for developing and validating the HMI application. Computer system 1201 may include a central processing unit ("CPU" or "processor") 1202. Processor 1202 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 1202 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1202 may be disposed in communication with one or more input/output (I/O) devices via I/O interface 1203. The I/O interface 1203 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 1203, the computer system 1201 may communicate with one or more I/O devices. For example, the input device 1204 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1205 may be a printer, fax machine, video display (e.g., cathode ray tube (CRT), liquid crystal display (LCD), light-emitting diode (LED), plasma, or the like), audio speaker, etc. In some embodiments, a transceiver 1206 may be disposed in connection with the processor 1202. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 1202 may be disposed in communication with a communication network 1208 via a network interface 1207. The network interface 1207 may communicate with the communication network 1208. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1208 may include, without limitation, a direct interconnection, local area network (LAN), wide area network (WAN), wireless network (e.g., using Wireless Application Protocol), the Internet, etc. Using the network interface 1207 and the communication network 1208, the computer system 1201 may communicate with devices 1209, 1210, and 1211. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 1201 may itself embody one or more of these devices.

In some embodiments, the processor 1202 may be disposed in communication with one or more memory devices (e.g., RAM 1213, ROM 1214, etc.) via a storage interface 1212. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1216, user interface application 1217, web browser 1218, mail server 1219, mail client 1220, user/application data 1221 (e.g., any data variables or data records discussed in this disclosure), etc. The operating system 1216 may facilitate resource management and operation of the computer system 1201. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1217 may facilitate display, execution, interaction, manipulation, or operation of program components through textual or graphical facilities. For example, user interfaces may provide computer interaction interface elements on a display system operatively connected to the computer system 1201, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 1201 may implement a web browser 1218 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 1201 may implement a mail server 1219 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 1201 may implement a mail client 1220 stored program component. The mail client may be a mail viewing application, such as Apple Mail, Microsoft Entourage, Microsoft Outlook, Mozilla Thunderbird, etc.

In some embodiments, computer system 1201 may store user/application data 1221, such as the data, variables, records, etc. (e.g., view specification, BL specification, view component, BL component, platform componenet, interface design file, test cases, test scripts, primitive executables, parameters of each executables, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for HMI test automation framework (HTAF) that may aid in rapid development and validation (that is, testing) of the HMI application in an optimized, cost effective, efficient, and scalable manner. In particular, the techniques provide for a means of building a platform independent, easily configurable, HMI testing framework in an automated manner by leveraging view and BL components maintained as databases. It should be noted that any changes in view and BL component may be easily incorporated in the test automation framework. Additionally, the techniques provide for maximum testing coverage.

Additionally, the techniques described in the various embodiments discussed above have novel deployment architecture that addresses the constraints of limited resources in the target device for executing the test cases. This may be achieved by creation of resource efficient primitive executables, automatic generation of test scripts using such primitive executables, and execution of test cases through execution such test scripts. The primitive executable may be created from information available in view and BL database. Additionally, the techniques described in the various embodiments discussed above reduce the probability of failure of test case execution on a resource constrained device since the test case execution are sequenced based on the resource available at target device on run time and estimated resource usage by the primitive executables. Thus, the techniques may provide for validation of HMI application in Internet of Things (IoT) space where devices have varying computing resources.

Further, the techniques provide for a test automation that can perform validation based on the specific target device. In other words, primitive executables may be created for testing of the HMI application on the specific target device. Moreover, the techniques provide for a unique deployment architecture to automate the testing of the HMI application. As will be appreciated, since the view logic and the business logic are modeled as databases, the test cases and corresponding scripts may be generated automatically.

By way of an example, the techniques provide for deployment of HTAF. The HTAF may include test suite that includes primitive executables for HMI validation on the target device. Moreover, the test suite may help in generating test scripts automatically. The HTAF may further include a test agent at a test host. A scheduler may help in selecting the appropriate test suite and the target device using the test suite UI, and may trigger a test session. Moreover, the test host may be deployed in a PC, and a PC simulation may be developed.

The specification has described method, system, and framework for developing and validating the HMI application. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of testing a human machine interface (HMI) application on a target device, the method comprising:
   accessing, by a testing device on a host service delivery platform (HSDP), a test script corresponding to a test case for testing the HMI application on the target device, wherein the test script comprises a set of primitive executables, and wherein each of the set of primitive executables is configured to simulate at least one of a trigger or a condition corresponding to a business logic (BL) component of the HMI application and to verify an output using at least one of a view component or a platform component of the HMI application, and wherein primitive executables of the set of primitive executables are mutually independent,
   wherein the test script is automatically generated by determining the set of primitive executables from among a plurality of primitive executables based on trigger-guard-action information available for each state in the BL component of the HMI application,
      wherein determining the set of primitive executables from among the plurality of primitive executables comprises:
         determining a possible trigger for a current state by querying the BL component of the HMI application;

executing a first subset of appropriate primitive executables to simulate the possible trigger;
determining next state based on the current state and the possible trigger;
executing a second subset of appropriate primitive executables to simulate a negative condition and verifying when there is an appropriate effect or no effect on an outcome of an execution of the test script;
executing a third subset of appropriate primitive executables to simulate a positive condition and verifying when there is an appropriate effect on the outcome of the execution of the test script; and
verifying the outcome of the execution of the test script using at least one of the view component or the platform component of the HMI application;
transmitting, by the testing device on the HSDP, each of the set of primitive executables to the target device for execution; and
receiving, by the testing device on the HSDP, a result corresponding to the execution of the each of the set of primitive executables.

2. The method of claim 1, wherein each of the set of primitive executables is configured to simulate the trigger for at least one a user interface (UI) input or a system event in the BL component of the HMI application.

3. The method of claim 1, wherein each of the set of primitive executables is configured to simulate the condition corresponding to a guard condition defined in the BL component of the HMI application.

4. The method of claim 1, further comprising creating each of a plurality of primitive executables by:
simulating, based on a definition of each of a set of interfaces configured to implement the BL component of the HMI application on the target device, at least one of the trigger or the condition corresponding to the BL component of the HMI application; and
verifying the output using at least one of the view component or the platform component of the HMI application.

5. The method of claim 4, further comprising creating each of the plurality of primitive executables by:
determining a plurality of executable execution parameters for each of the plurality of primitive executables, wherein each of the plurality of executable execution parameters comprises at least one of a name of the primitive executable, a plurality of input parameters, a plurality of output parameters, a response format for an output, an estimated time of execution, an estimated usage of one or more resources of the target device, or a coverage of one or more components of the target device.

6. The method of claim 1, wherein transmitting each of the set of primitive executables for execution comprises:
determining an availability of each of one or more resources in the target device; and
transmitting each of the set of primitive executables to the target device based on the availability.

7. The method of claim 1, further comprising:
determining an outcome of an execution of the test script based on the result corresponding to the execution of the each of the set of primitive executables; and
verifying the outcome of the execution of the test script with an expected view image available in the BL component of the HMI application.

8. A system for testing a human machine interface (HMI) application on a target device, the system comprising:
a host service delivery platform (HSDP) comprising at least one processor and a computer-readable medium storing instructions that, when executed by the at least one processor, cause the at least one processor to perform operations comprising:
accessing a test script corresponding to a test case for testing the HMI application on the target device, wherein the test script comprises a set of primitive executables, and wherein each of the set of primitive executables is configured to simulate at least one of a trigger or a condition corresponding to a business logic (BL) component of the HMI application and to verify an output using at least one of a view component or a platform component of the HMI application, and wherein primitive executables of the set of primitive executables are mutually independent,
wherein the test script is automatically generated by determining the set of primitive executables from among a plurality of primitive executables based on trigger-guard-action information available for each state in the BL component of the HMI application,
wherein determining the set of primitive executables from among the plurality of primitive executables comprises:
determining a possible trigger for a current state by querying the BL component of the HMI application;
executing a first subset of appropriate primitive executables to simulate the possible trigger;
determining next state based on the current state and the possible trigger;
executing a second subset of appropriate primitive executables to simulate a negative condition and verifying when there is an appropriate effect or no effect on an outcome of an execution of the test script;
executing a third subset of appropriate primitive executables to simulate a positive condition and verifying when there is an appropriate effect on the outcome of the execution of the test script; and
verifying the outcome of the execution of the test script using at least one of the view component or the platform component of the HMI application;
transmitting each of the set of primitive executables to the target device for execution; and
receiving a result corresponding to the execution of the each of the set of primitive executables.

9. The system of claim 8, wherein each of the set of primitive executables is configured to:
simulate the trigger for at least one a user interface (UI) input or a system event in the BL component of the HMI application; or simulate the condition corresponding to a guard condition defined in the BL component of the HMI application.

10. The system of claim 8, wherein the operations further comprise creating each of a plurality of primitive executables by:
simulating, based on a definition of each of a set of interfaces configured to implement the BL component of the HMI application on the target device, at least one of the trigger or the condition corresponding to the BL component of the HMI application; and
verifying the output using at least one of the view component or the platform component of the HMI application.

11. The system of claim 10, wherein the operations further comprise creating each of the plurality of primitive executables by:
- determining a plurality of executable execution parameters for each of the plurality of primitive executables, wherein each of the plurality of executable execution parameters comprises at least one of a name of the primitive executable, a plurality of input parameters, a plurality of output parameters, a response format for an output, an estimated time of execution, an estimated usage of one or more resources of the target device, or a coverage of one or more components of the target device.

12. The system of claim 8, wherein the operations further comprise:
- determining an outcome of an execution of the test script based on the result corresponding to the execution of the each of the set of primitive executables; and
- verifying the outcome of the execution of the test script with an expected view image available in the BL component of the HMI application.

13. A non-transitory computer-readable medium storing computer-executable instructions for:
- accessing a test script corresponding to a test case for testing the HMI application on the target device, wherein the test script comprises a set of primitive executables, and wherein each of the set of primitive executables is configured to simulate at least one of a trigger or a condition corresponding to a business logic (BL) component of the HMI application and to verify an output using at least one of a view component or a platform component of the HMI application, and wherein primitive executables of the set of primitive executables are mutually independent,
- wherein the test script is automatically generated by determining the set of primitive executables from among a plurality of primitive executables based on trigger-guard-action information available for each state in the BL component of the HMI application,
  - wherein determining the set of primitive executables from among the plurality of primitive executables comprises:
    - determining a possible trigger for a current state by querying the BL component of the HMI application;
    - executing a first subset of appropriate primitive executables to simulate the possible trigger;
    - determining next state based on the current state and the possible trigger;
    - executing a second subset of appropriate primitive executables to simulate a negative condition and verifying when there is an appropriate effect or no effect on an outcome of an execution of the test script;
    - executing a third subset of appropriate primitive executables to simulate a positive condition and verifying when there is an appropriate effect on the outcome of the execution of the test script; and
    - verifying the outcome of the execution of the test script using at least one of the view component or the platform component of the HMI application;
- transmitting each of the set of primitive executables to the target device for execution; and
- receiving a result corresponding to the execution of the each of the set of primitive executables.

14. The non-transitory computer-readable medium of claim 13, further storing computer-executable instructions for creating each of a plurality of primitive executables by:
- simulating, based on a definition of each of a set of interfaces configured to implement the BL component of the HMI application on the target device, at least one of the trigger or the condition corresponding to the BL component of the HMI application; and
- verifying the output using at least one of the view component or the platform component of the HMI application.

15. The non-transitory computer-readable medium of claim 13, further storing computer-executable instructions for:
- determining an outcome of an execution of the test script based on the result corresponding to the execution of the each of the set of primitive executables; and
- verifying the outcome of the execution of the test script with an expected view image available in the BL component of the HMI application.

* * * * *